(12) United States Patent
Hofman

(10) Patent No.: US 11,499,282 B2
(45) Date of Patent: Nov. 15, 2022

(54) METHOD FOR STABILIZING A JACK-UP PLATFORM UNIT

(71) Applicant: GustoMSC B.V., Schiedam (NL)

(72) Inventor: Johannes Andries Hofman, Rotterdam (NL)

(73) Assignee: GustoMSC B.V., Schiedam (NL)

( * ) Notice: Subject to any disclaimer, the term of this patent is extended or adjusted under 35 U.S.C. 154(b) by 0 days.

(21) Appl. No.: 17/211,348

(22) PCT Filed: Sep. 25, 2019

(86) PCT No.: PCT/NL2019/050646
§ 371 (c)(1),
(2) Date: Mar. 24, 2021

(87) PCT Pub. No.: WO2020/067896
PCT Pub. Date: Apr. 2, 2020

(65) Prior Publication Data
US 2021/0372070 A1  Dec. 2, 2021

(30) Foreign Application Priority Data

Sep. 25, 2018 (NL) ...................................... 2021708

(51) Int. Cl.
*E02B 17/02* (2006.01)
*E02B 17/00* (2006.01)
(52) U.S. Cl.
CPC ........ *E02B 17/021* (2013.01); *E02B 17/0017* (2013.01); *E02B 2017/0039* (2013.01); *E02B 2017/0056* (2013.01)

(58) Field of Classification Search
CPC .................. E02B 17/021; E02B 17/08; E02B 2017/0056; E02B 17/0017; E02B 2017/0039
See application file for complete search history.

(56) References Cited

U.S. PATENT DOCUMENTS

| 4,456,402 | A | * | 6/1984 | Boon | .................... | E02B 17/021 |
| | | | | | | 405/206 |
| 4,456,404 | A | | 6/1984 | Evans | | |

(Continued)

FOREIGN PATENT DOCUMENTS

WO    2018074923 A1    4/2018

OTHER PUBLICATIONS

International Search Report and Written Opinion—PCT/NL2019/050646—dated Feb. 13, 2020.

*Primary Examiner* — Carib A Oquendo
(74) *Attorney, Agent, or Firm* — Banner & Witcoff, Ltd.

(57) ABSTRACT

Method for stabilizing a jack-up platform unit, the unit including a hull, a plurality of legs which are extendible from and/or through the hull and which are arranged to support the platform unit during off-shore operations, and a jacking system arranged to move the legs between a transport position and an operational position, wherein the jacking system is also arranged to move the hull along the plurality of legs between a floating position and an operational position, the method comprising the steps of lowering the plurality of legs until the legs stand on or in the seabed, raising the hull substantially above the sea surface, temporarily applying a preloading on the plurality of legs, further raising the hull to an operational height above the sea surface.

6 Claims, 7 Drawing Sheets

(56) References Cited

U.S. PATENT DOCUMENTS

| | | | |
|---|---|---|---|
| 4,512,553 A * | 4/1985 | Dunham | E02B 17/0818 254/89 R |
| 5,188,484 A * | 2/1993 | White | E02B 17/021 405/206 |
| 2002/0182014 A1* | 12/2002 | Kawasaki | E02B 17/021 405/196 |
| 2005/0260040 A1* | 11/2005 | Ingle | E02D 27/42 405/196 |
| 2009/0090191 A1* | 4/2009 | Lenders | E02B 17/021 73/786 |
| 2013/0189038 A1* | 7/2013 | Lenders | E02B 17/021 405/196 |
| 2015/0354164 A1 | 12/2015 | Kok Seng et al. | |
| 2019/0322338 A1* | 10/2019 | Stroo | F03D 13/25 |

\* cited by examiner

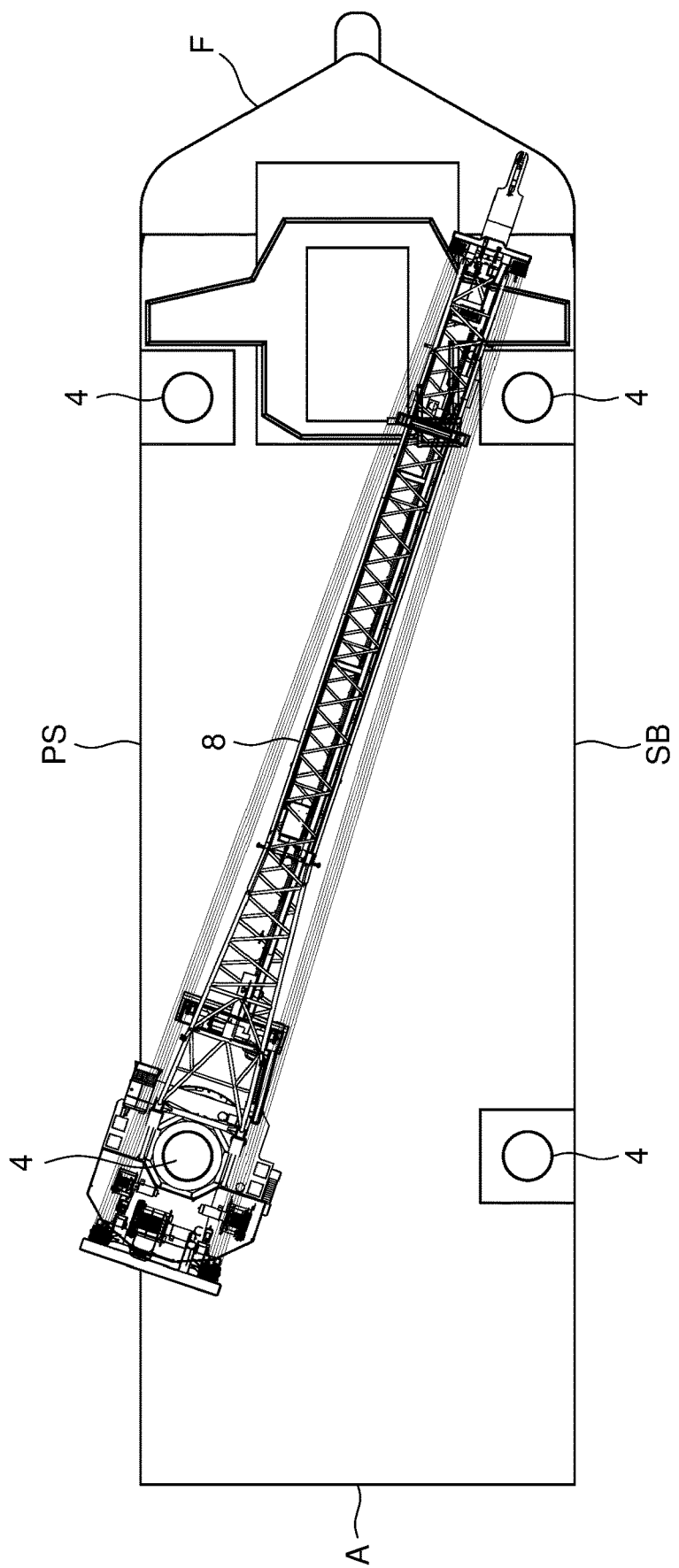

METHOD FOR STABILIZING A JACK-UP PLATFORM UNIT

CROSS-REFERENCE TO RELATED APPLICATIONS

This application is a U.S. National Stage application under 35 U.S.C. § 371 of International Application PCT/NL2019/050646 (published as WO 2020/067896 A1), filed Sep. 25, 2019, which claims the benefit of priority to Application NL 2021708, filed Sep. 25, 2018. Benefit of the filing date of these prior applications is hereby claimed. Each of these prior applications is hereby incorporated by reference in its entirety.

The invention is related to a method for stabilizing a jack-up platform unit.

Jack-up platform units generally comprise a buoyant hull as well as a plurality of movable legs which are extendible from and/or through said hull, for example three legs, four legs, six legs, or more. Jack-up platform units usually also include at least one crane mounted on the platform unit, for example mounted around one of the legs, or mounted elsewhere on the platform, and/or a movable cantilever for supporting operations outside of the platform. Said jack-up platforms can be self-sailing or self-propelled, or may need to be towed. Jack-up platform units are widely used in off-shore industry, for example at off-shore drilling sites, for building large bridges spanning water, or for example for the installation and/or maintenance of off-shore wind turbines. When a jack-up platform unit has arrived on site, the unit needs to be stabilized in a relatively harsh environment of the sea before any work can begin. Thereto, the legs of the jack-up unit are lowered until the legs can rest on the seabed. Then, the jack-up platform is raised just above sea-level along the legs via a jacking system. As the stability of the underlying seabed is not known in detail, it is common practice to apply a high load, for example of some thousands of tons, to each of the legs in turns, for example individually or in pairs, while the other legs remain only slightly loaded, which procedure is often referred to as 'preloading'. The value of the applied load can then be used to determine a maximal allowable load value that the legs can support during survival conditions or during operations on the platform without jeopardizing the stability of the platform unit. For example, the maximum allowable value can be determined to be for example a given fraction of the load applied to the legs during preloading. After this preloading step, the hull is further raised to a desired operational elevation above the sea surface, for example to a height of more or less 10 to 15 m above the sea surface, which substantially avoids the hull being continuously hit by waves. Before or after further raising the hull, the load on the legs may be substantially equalized. In this way, a relatively stable platform is established from which operations can be executed almost independently of current and/or wave action.

Over the recent years, the size of the off-shore constructions needing the use of jack-up platform units for their construction has been growing steadily, such as for example the height and overall size of wind turbines. This increase in size is a challenge for the off-shore industry, in particular implying the need for larger crane capacities. A large crane or cantilever operating over the side of a jack-up may result in a significant loading of the legs, in particular on the one or more legs in the direct vicinity of the crane or the cantilever. This effect is even more pronounced when a crane is mounted around a leg of the jack-up platform unit.

In some cases, the loading of a leg during crane or cantilever operations may come close, or even exceed, the achieved preloading of the legs, which may eventually result in an uncontrolled settlement of the jack-up platform, a punch through, or even in a collapse of the crane and/or of the jack-up platform unit. Therefore, there is a need for an improved stabilization method of jack-up platform units.

It is an aim of the present invention to solve or alleviate one or more of the above-mentioned problems. Particularly, the invention aims at providing an improved method for stabilizing a jack-up platform unit which can ensure relatively safe operations while maintaining or improving capacities to work over the side of the platform unit with for example a crane or a cantilever or any other device with direct impact on leg loads.

To this aim, there is provided a method for stabilizing a jack-up platform unit characterized by the features of claim 1. In particular, a jack-up platform unit, for example a jack-up rig or a self elevating vessel, includes a hull, which may, but need not, be a buoyant hull. The platform unit also includes a plurality of legs, for example four, five, six or more legs, which are extendible from and/or through the hull and which are arranged to support the platform unit during off-shore operations. The unit further includes a jacking system arranged to move the plurality of legs between a transport position, in which the legs extend substantially above the platform, and an operational position, in which the legs extend substantially below the platform to stand on a seabed, the jacking system also being arranged to move the hull along the plurality of legs between a floating position, wherein the hull floats on water, and an operational position, in which the hull is substantially above sea surface. Such a jacking system can for example be a hydraulic system, an electric system, a rack-an-pinion system, a combination thereof, or any other suitable system known to the person skilled in the art. A jack-up platform unit can generally also include at least one crane or may include a cantilever mounted on the platform, which are arranged to lift loads on and/or off the platform during offshore installation and/or maintenance work. A method to stabilize such a jack-up platform unit generally comprises the steps of lowering the plurality of legs until the legs stand on or in the seabed, and raising the hull substantially above the sea surface, to a level where a bottom side of the hull is typically 1.5 m above still water level. Before raising the hull above the sea surface, a first test of pre-loading with a limited load on the legs may optionally be performed in order to check whether or not it is safe to raise the hull above the sea level. This test may be performed with the hull slightly raised along the legs, but not above the sea level, just high enough such that a weight of the platform unit prevents the legs from losing contact with the seabed because of wave forces acting on the unit. After raising the hull above the sea surface, a preload is temporarily applied on the plurality of legs. Preloading should be understood in a broad sense as applying a load to each of the legs above a static leg load, which can be done in various ways. Each of the legs can for example be directly preloaded by actively pushing legs down with excess load of the jacking system, which may be referred to as 'pre-driving'. Alternatively, the legs may also be indirectly preloaded, in which case load is decreased on at least one leg resulting in an increase of load on at least some of the other legs. Decreasing load on a leg can for example be obtained by slightly lowering the hull along said leg. Still another possibility of preloading is for example temporarily taking in large quantities of water ballast, which can be shifted around on the platform. After preloading the legs, the hull is further raised to an operational height above the sea surface, typically to a height of more or less 15 m above the sea surface. In an inventive way, the method to stabilize the jack-up platform unit now further comprises a step of applying a torque to the hull of the jack-up platform unit, in particular a step of actively applying a torque to the hull. An active application of a torque to the hull is thus not a result of an incorrect or unprecise operation of the jacking process before. Due to the torque in the hull, the load distribution can be consciously differentiated over the different legs such that the load distribution can be adjusted in function of a location of at least one crane or cantilever mounted on the platform. In this way, an overload due to crane or cantilever use, for example higher than the applied load during preloading of the legs, may be avoided.

Typically, the jacking operator coordinates the pre-loading operations. Applying a pre-load to a specific leg, which can be done in various ways as explained above, is repeated for that specific leg by the jacking operator until the jacking operator is of the opinion, given his experience and expertise, that the leg is sufficiently settled and the foundation is stable. The pre-loading operation is repeated for all legs and can be done for each leg individually or for pairs of legs. For a four-legged or six-legged platform, the pre-loading is usually done for pairs of diagonally opposite legs simultaneously. The pre-load value thus determined by the jacking operator is used for determining the operational capacity of the jack-up platform.

The jacking operator may determine a pre-load value for each leg. After pre-loading, the load onto all of the legs is usually equalized. This means that the load, namely the weight of the platform, is approximately equally distributed over all of the legs. After this equalizing, the hull of the jack-up platform is then moved to its operational condition at an operational height above the sea surface. When the hull is at operational level, the static load on each leg is considered the installed load.

The pre-load value defines the maximum allowable load that a leg can handle without jeopardizing the stability of the platform. In practice, the theoretical maximum allowable load on a leg is defined as the pre-load value with a safety margin on it. The safety margin can for example be between about 2% up to 20% depending on operator, conditions etc. The operational margin of the leg can then be calculated as the difference between the maximum allowable load, which is the safety margin times the pre-load value, and the installed load. This difference determines the operational margin or the working capacity on the respective leg. This information is important for e.g. a crane operator who performs lifting and/or hoisting operations with his crane. During the crane operations, the crane operator needs to operate his crane within the operational margin defined on the legs, in particular the leg that is closest to the crane may be limiting the working capacity of the crane. For a specific load, hoisting angle, boom angle etc. changes the load that the crane exerts onto the legs. Therefore, the operational margin can be consumed for some load, hoisting angle or boom angle more than for other operational conditions. This may limit the lifting capacity of the crane. To increase the operational working capacity of the crane while using the same jack-up platform, the invention provides for an additional step once the jack-up platform is in operational condition at operational height above the sea surface. This additional step is the so-called pre-torque step, in which the load on at least one leg is decreased with respect to the other legs, thus resulting in a torque applied to the hull. For example, a pair of diagonally opposite legs are loaded more than the other pair of diagonally opposite legs, in case of a four-legged platform. As a result, the static load or installed load on one the legs is significantly lower than the static load on the other legs. Respectively, the static load or installed load on one of the pairs of diagonally opposed legs is significantly lower than on the other pair of diagonally opposed legs. By applying such a torque on the hull, and thus significantly decreasing the load on one of the legs, the operational margin on that leg can be increased. Advantageously, this is the leg closest to the crane, or cantilever, resulting in a larger crane operational envelope due to the increased operational margin of the said leg.

Advantageously, the one of the legs of the pair of diagonally opposed legs that now has the lower static load is closest to the crane. As such, the operational margin for the crane is increased as now the difference between the lower static load and the maximum load (pre-load*safety margin) is larger. Thus, with a simple operational step, the crane or cantilever working capacity can be increased without structural adaptations or modifications to the jack-up platform. For a six-legged platform, one of the pairs of diagonally opposed legs can be decreased in loading, preferably the pair of which one of the legs is closest to the crane. The other two pairs, or one of the other two pairs of legs can have an increased static load.

As an illustrative example, the following is illustrated. A four legged jack-up platform unit may have a maximum elevated weight of 18000 t. Each of the legs are pre-loaded up to a pre-load value of 9000 t per leg. As a safety margin 20% is taken. After pre-loading, the weight of the platform is equalized over all four legs, resulting in a theoretical equalized load of 4500 t per leg. The operational margin per leg is the difference between the maximum allowable leg load, i.e. safety margin times pre-load value, and, here, the equalized leg load as installed load, here this is: 0.8*9000−4500=2700 t. This value determines the operational envelope for, e.g. the crane operations. Also the load on the leg closest to the crane, and thus taking more of the operational crane load, may not exceed the maximum allowable leg load. This may for some lifting and/or hoisting operations result in a truncated operational crane envelope, in that the crane boom may not extend beyond a certain distance from the leg or crane base. This limits the operational crane capacity. So, according to the invention, when the jack-up platform is in operational condition at operational level above the sea surface, a pre-torque is applied to the hull. In this example, the load on a pair of diagonally opposite legs of which one leg is closest to the crane is decreased, in the example up to 4000 t. The other pair of diagonally opposed legs consequently has an increased static load, namely 5000 t. The operational margin on the leg closest to the crane, which is most limiting for crane operations, is now 0.8*9000−4000=3200 t. So, an increase in operational margin of 500 t is obtained, which allows the crane operator to lift and/or hoist more heavy loads and/or to reach a farther outreach with his crane without jeopardizing the stability of the platform. In a further numeric example, the load on one of the pairs of diagonally opposed legs can be decreased up to 3500 t, resulting in a load increase on the other pair of legs up to 5500 t. The operational margin of the leg closest to the crane is now 0.8*9000−3500=3700 t, which significantly increases the operational crane envelope, and thus may allow the lifting and/or hoisting of a more heavy load, or a lifting and/or hoisting operation in more severe conditions, or a lifting and/or hoisting operation to a target further away etc.

So, according to the invention, after the hull of the jack-up platform has reached operational position, pairs of diagonally opposed legs are loaded differently, resulting in a different static load. This difference in static load between the pairs of diagonally opposed legs introduced a so-called pre-torque in the hull. Of course this example is only illustrative, in reality other loads also have an influence, such as environmental loads, friction loads etc. It is noted that the step of equalizing the weight of the platform over the legs after pre-loading and before raising the hull to the operational height, remains. It is only when the hull is at operational height above the sea surface that the step of pre-torqueing is applied.

Preferably, the difference in installed load, after pre-torqueing, between the leg with the decreased load and the other legs having the increased load, with respect to the legs having the higher installed load value, is preferably more than 5%, more preferably more than 10%, advantageously between about 5% and about 50%, more advantageously between about 10% and about 50%. This deliberately introduced difference in static load between, for example, the pairs of legs, is much larger than differences that may occur in conventional operations in which a jacking operator tries his best to distribute the load evenly as possible, but which may, in practice, always imply slight differences. This deliberately introduced static difference that results in the pre-torque of the hull, is also larger than static load differences that are sometimes introduced to accommodate variations in soil conditions. This method of pre-torqueing is also applicable irrespective of the way how the pre-load value was determined, e.g. by experience and expertise and human judgment of the jacking operator or using a calculation algorithm determining the achieved pre-load.

Applying a torque to the hull can be done in different ways. For example, the hull may be slightly raised along at least one leg, which increases load directly on said leg and applies a torque on the hull. Preferably, a torque to the hull may be applied by decreasing load on at least one leg, for example by slightly lowering the hull along said at least one leg, resulting in an increase of load on the other legs. The resulting differentiated load distribution over the legs can then induce a torque in the hull. This indirect way of applying a torque to the hull can have the advantage of needing less energy than for example increasing the load on at least one leg directly. Alternatively, also a shifting of ballast weight around the platform may induce a torque in the hull of the platform. However, this method may be rather inconvenient in practice.

In an advantageous way, load can be decreased on the at least one leg which is closest to at least one crane or cantilever mounted on the platform. This allows a higher operational loading of the crane without exceeding the allowed load on the leg, and/or a larger working range for crane or cantilever operations.

The present method can especially be advantageous when the jack-up platform unit comprises at least four legs, for example four legs, five legs, six legs or more. The legs can for example be distributed substantially equally over the platform, for example along a shape of a rectangle.

More preferably, when the unit includes at least four legs, load can be decreased both on the leg which is closest to the at least one crane or cantilever mounted on the platform, as well as on a leg which is located substantially diagonally opposite said leg closest to said at least one crane or cantilever. Substantially diagonally opposite should also be understood broadly, especially when more than 4 legs are implied, i.e. two legs which are not directly neighbouring legs are considered to be diagonally opposite legs. Unloading a diagonal pair of legs, for example by slightly lowering the hull along said pair of legs, puts a higher load on the other legs resulting in a torque in the hull. At the same time, by decreasing load over a diagonal pair of legs, stability of the platform is substantially maintained during load redistribution.

The method of stabilizing a jack-up platform unit may further comprise a step of substantially equalizing load on each of the legs before applying a torque to the hull of the jack-up platform unit. Equalizing loads may be understood as bringing loads on each of the legs as close as practically possible to a substantially equal average load level. This step may for example be performed just before raising the hull from a level just above sea level to an operational level, as the raising of the hull or jacking can then be done with less power from the jacking system. Once the hull has reached its operational height, the step of equalizing the load over the legs may optionally be repeated to correct for slight differences in load distribution due to the jacking operation.

The present invention will be further elucidated with reference to figures of exemplary embodiments. Corresponding elements are designated with corresponding reference signs.

FIG. 2 shows a top view of the jack-up platform unit of FIGS. 1a and 1b;

Figure 1A:
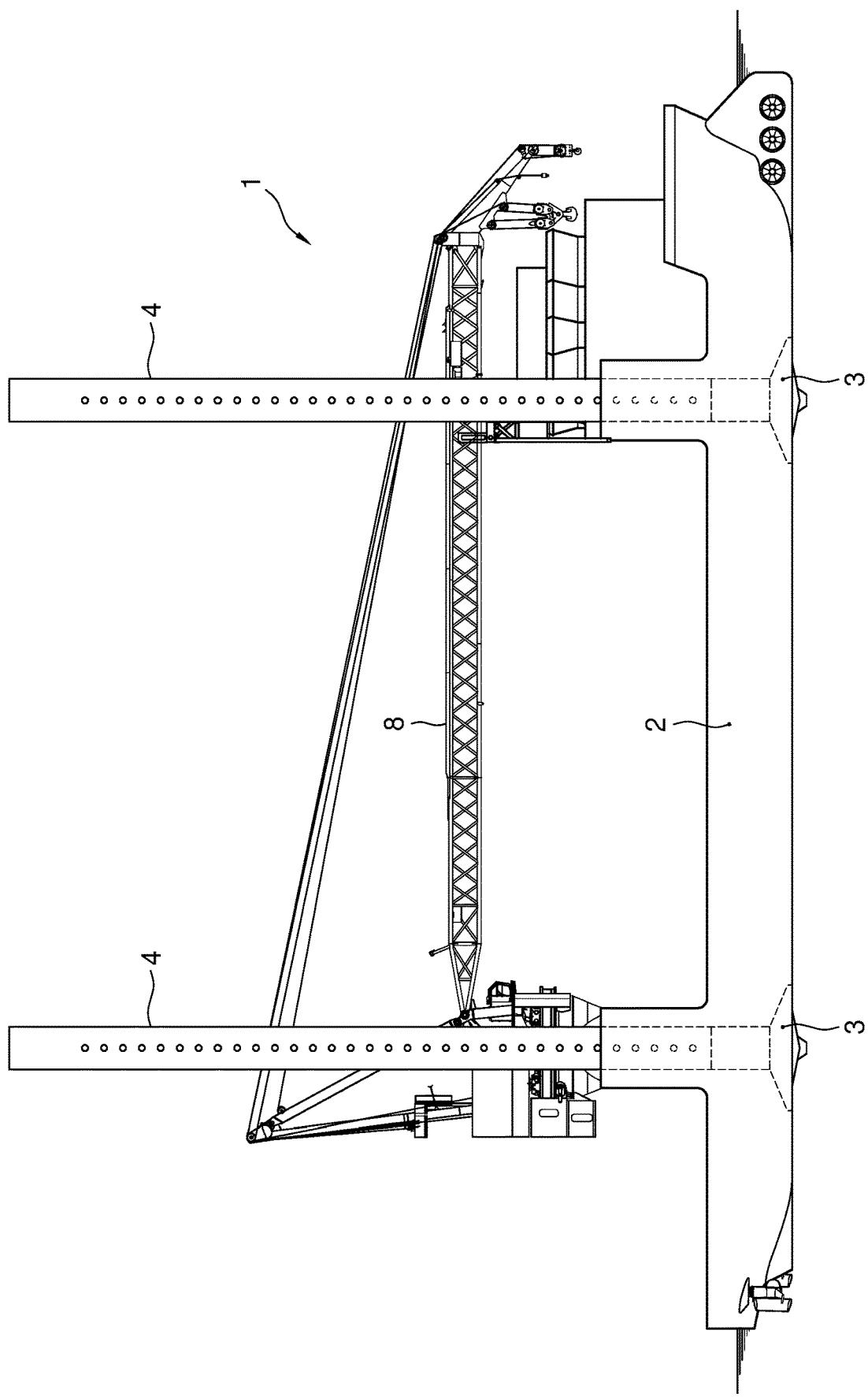
FIGS. 1a and 1b show a side view of an exemplary embodiment of a jack-up platform unit in a sailing configuration and an operating configuration respectively.
Figure 1B:
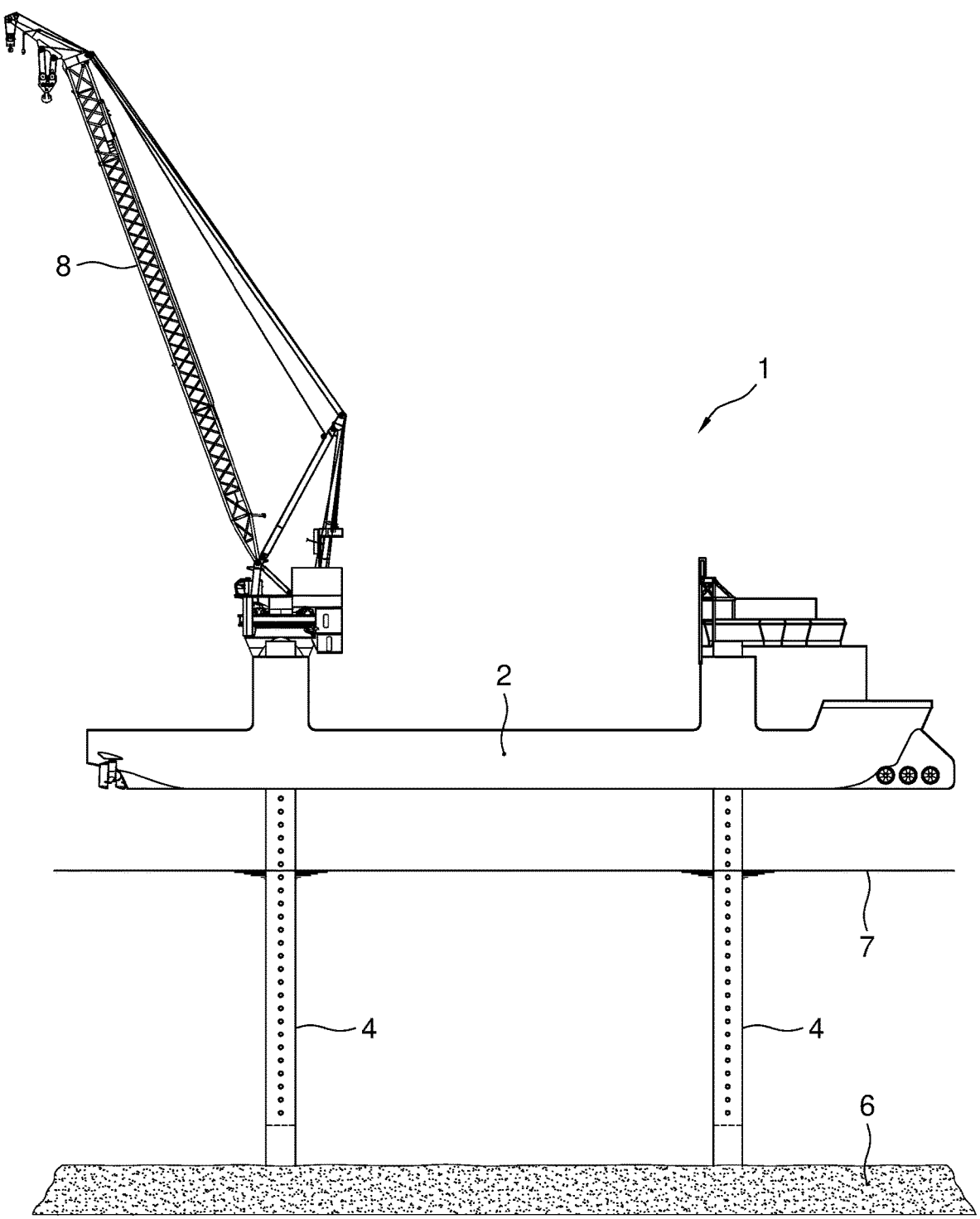

FIGS. 1a and 1b show a side view of an exemplary embodiment of a jack-up platform unit 1 in a sailing configuration and an operating configuration respectively. The jack-up platform unit 1, which is a self-propelled vessel in this case, includes a buoyant hull 2, as well as a plurality of legs 4, in this example a set of four legs 4, which are extendible from and/or through the hull 2 and which are arranged to support the platform unit 1 during off-shore operations. A jacking system (not shown) is arranged to move the legs 4 between a transport position, shown in FIG. 1a, in which the legs 4 extend substantially above the hull 2, and an operational position, shown in FIG. 1b, in which the legs 4 extend substantially below the hull 2 to stand on a seabed 6. Depending on the composition of the seabed 6, the legs 4 may rest on the seabed 6, or may partially sink into the seabed 6. In this example, an enlarged foot 3 of the legs has sunk into the seabed 6. The jacking system is also arranged to move the hull 2 along the plurality of legs 4 between a floating position, wherein the hull 2 floats on water, and an operational position, in which the hull 2 is substantially above sea surface 7. Once such a jack-up platform unit 1 has reached an offshore work site, the jack-up platform unit 1 first needs to be stabilized in order to provide a relatively safe working environment. This process requires several steps. First, the legs 4 are lowered until the legs 4 stand on or in the seabed 6. It is then preferred to perform a first test of pre-loading with a limited load on the legs 4 in order to check whether or not it is safe to raise the hull 2 above the sea level 7. This test may be performed with the hull 2 slightly raised along the legs 4, but not above the sea level 7, just high enough such that a weight of the platform unit 1 prevents the legs 4 from losing contact with the seabed 6 because of wave forces acting on the unit 1, in particular on the hull 2. As a next step, the hull 2 is raised substantially above the sea surface 7, to a level where a bottom side of the hull 2 is typically 1.5 m above still water level. After raising the hull 2 above the sea surface 7, a preload is temporarily applied on the legs 4, i.e. a load above a static leg load is applied to each of the legs 4 in turns. This is preferably done by slightly lowering the hull 2 along a diagonal pair of legs. As a result, load on the other diagonal pair of legs is significantly increased. After preloading the legs 4, the load on each of the legs 4 may be equalized before the hull 2 is further raised to an operational height above the sea surface 7, typically to a height of more or less 15 m above the sea surface 7. Once the hull 2 has reached this operational height, the step of equalizing the load over the legs may optionally be repeated to correct for slight differences in load distribution due to the jacking operation.

FIG. 2 shows a top view of the jack-up platform unit 1 of FIGS. 1a and 1b. The hull 2 as seen from above has a substantially rectangular shape. The four legs 4 are substantially equally distributed over the hull 2: two legs are located towards the fore F of the vessel, of which one on port side PS and one on starboard SB, and two legs at the aft A of the vessel, of which one at port side PS and one on starboard SB. On the hull 2, at least one crane 8 is mounted. In this example, the crane 8 is mounted around one of the four legs 4, in particular around the leg located aft on port side PS of the hull 2, but the crane could also be mounted elsewhere on the platform unit 1. The crane 8 can be arranged to be movable between a sailing position, in which the crane is folded down, extending over the hull 2, as shown in FIGS. 1a and 2, and a operational position, in which the crane 8 is arranged to be upright, as shown in FIG. 1b. The crane 8 is preferably arranged to be pivotable over 360 degrees such that the crane 8 can pick up load from the platform unit 1 and lift the load overboard, for example onto a building site, such as a construction site of an off-shore wind turbine. However, depending on the load, the working range of the crane 8 may be more or less limited.

Figure 3A:
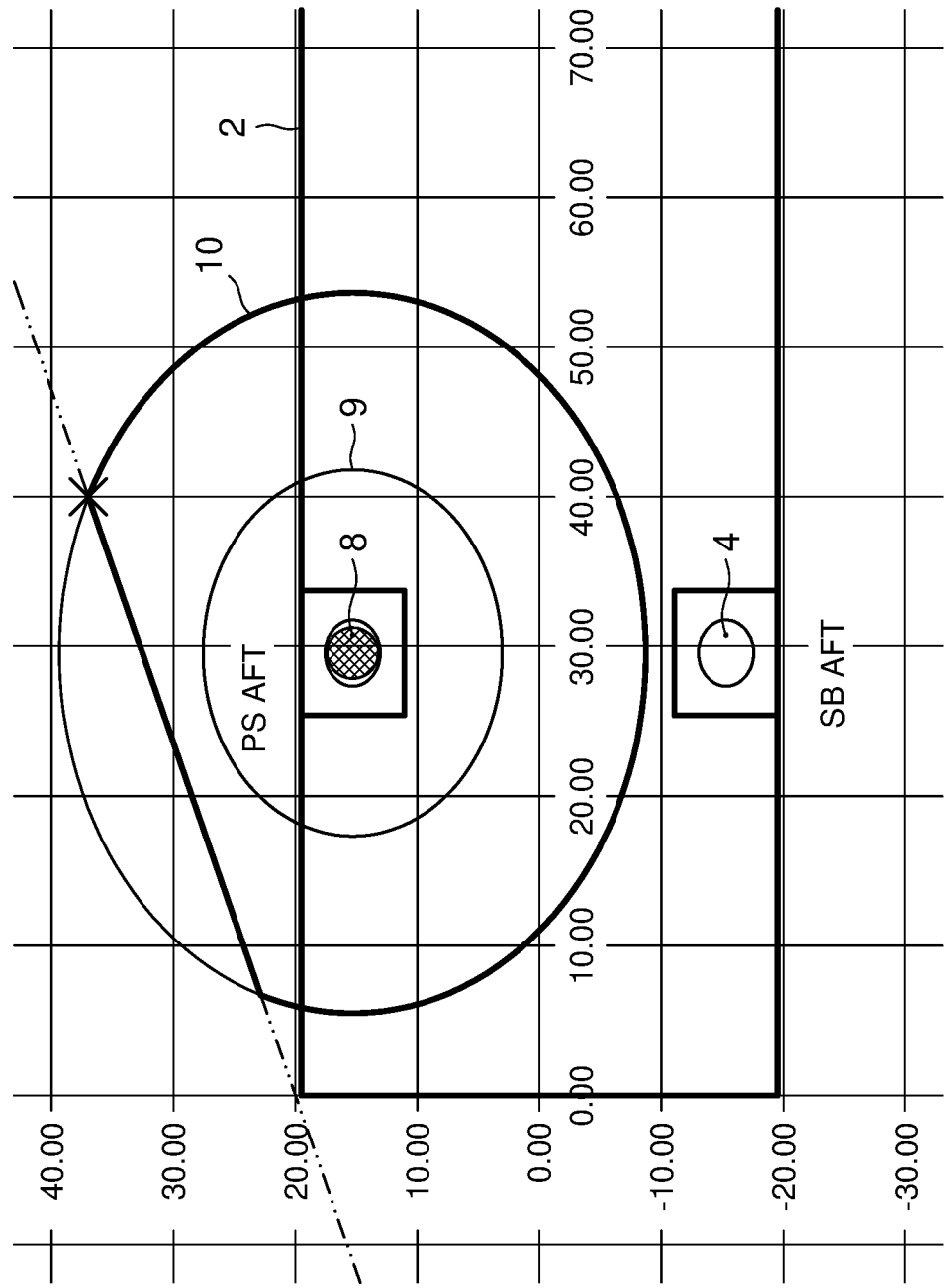
FIGS. 3a, 3b, 3c and 3d show a series of four graphs representing a safe working range for a given crane load of a crane mounted on a platform unit shown in FIGS. 1a and 1b.
Figure 3B:
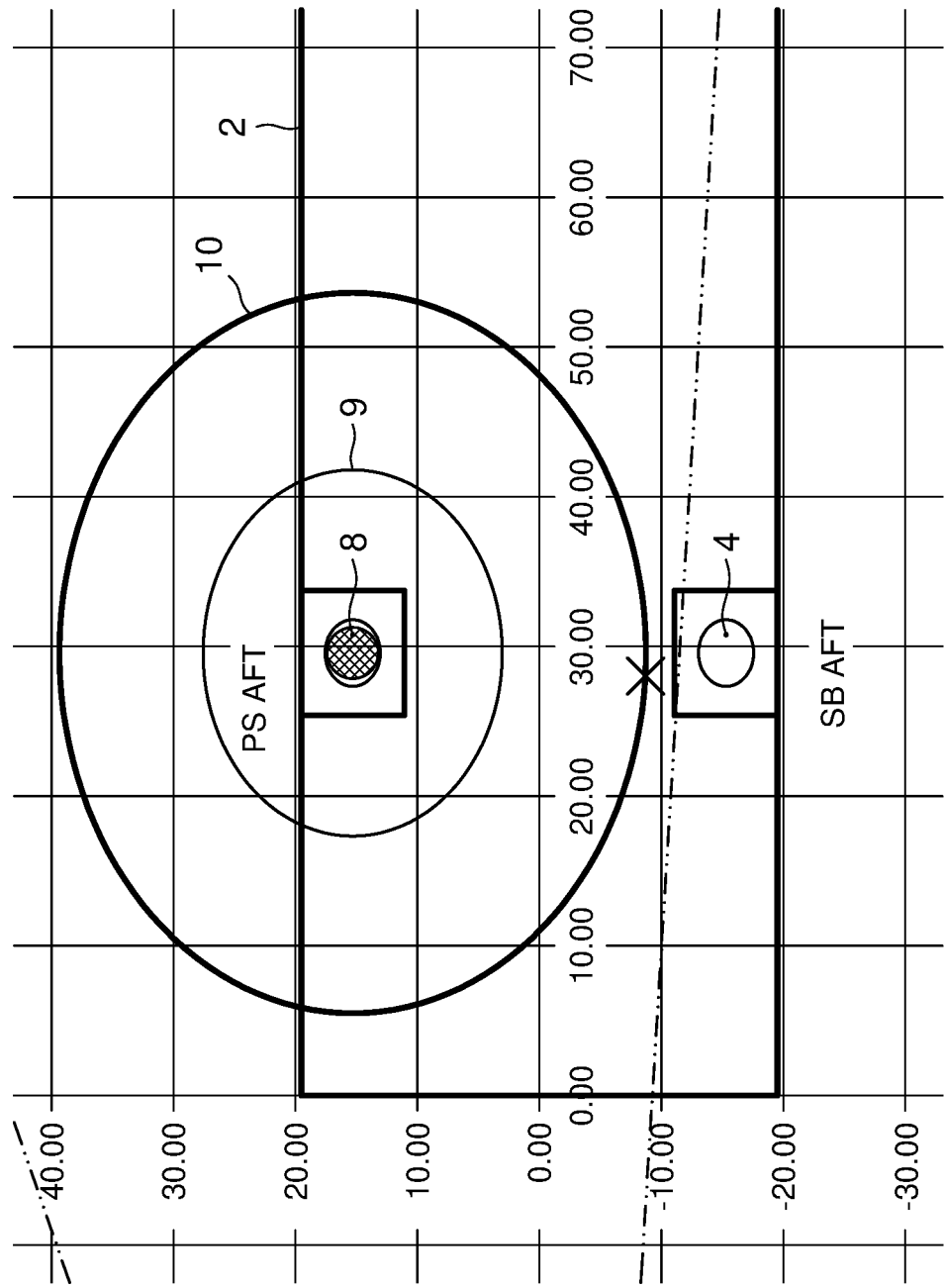
Figure 3C:
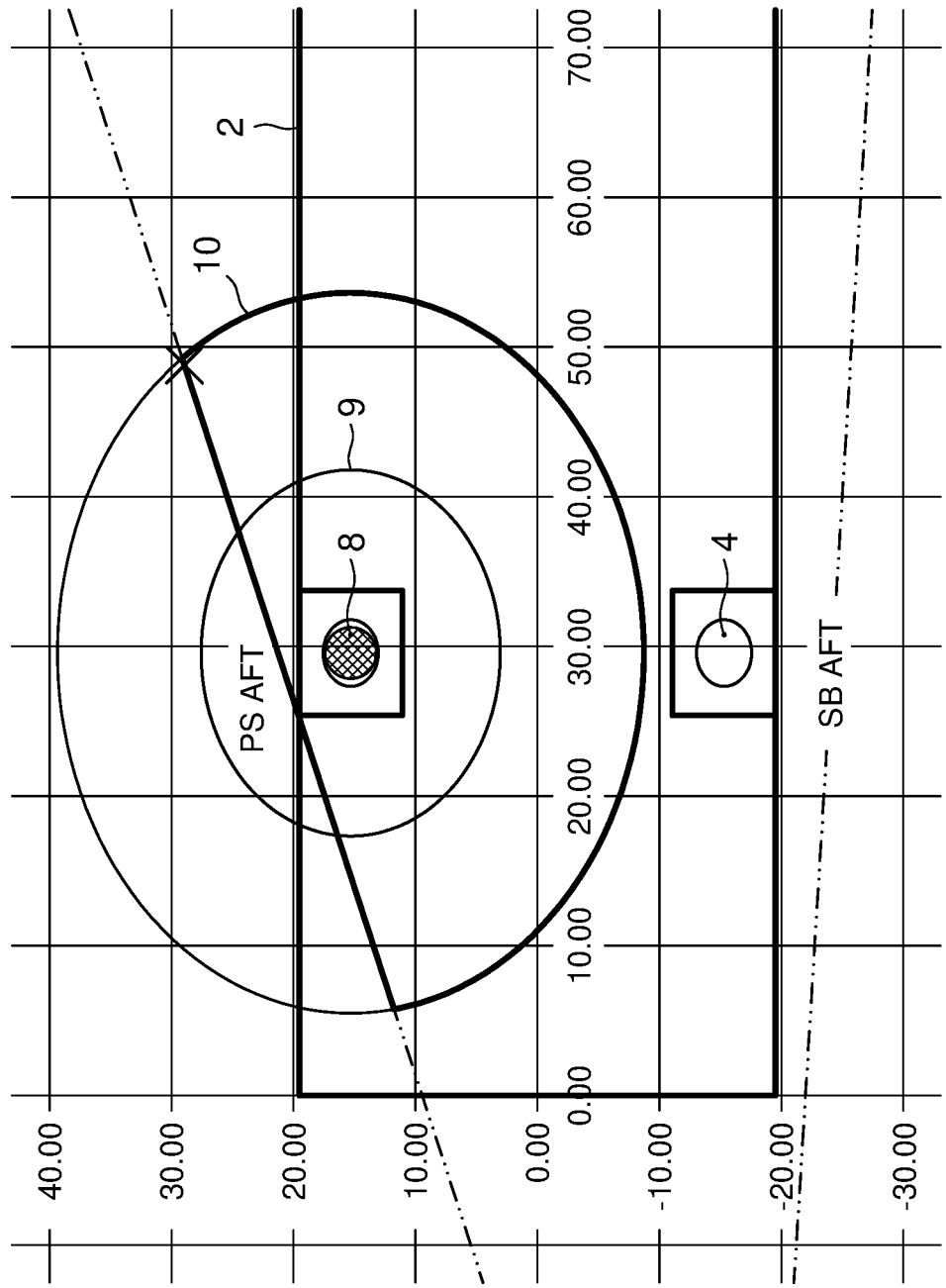
Figure 3D:
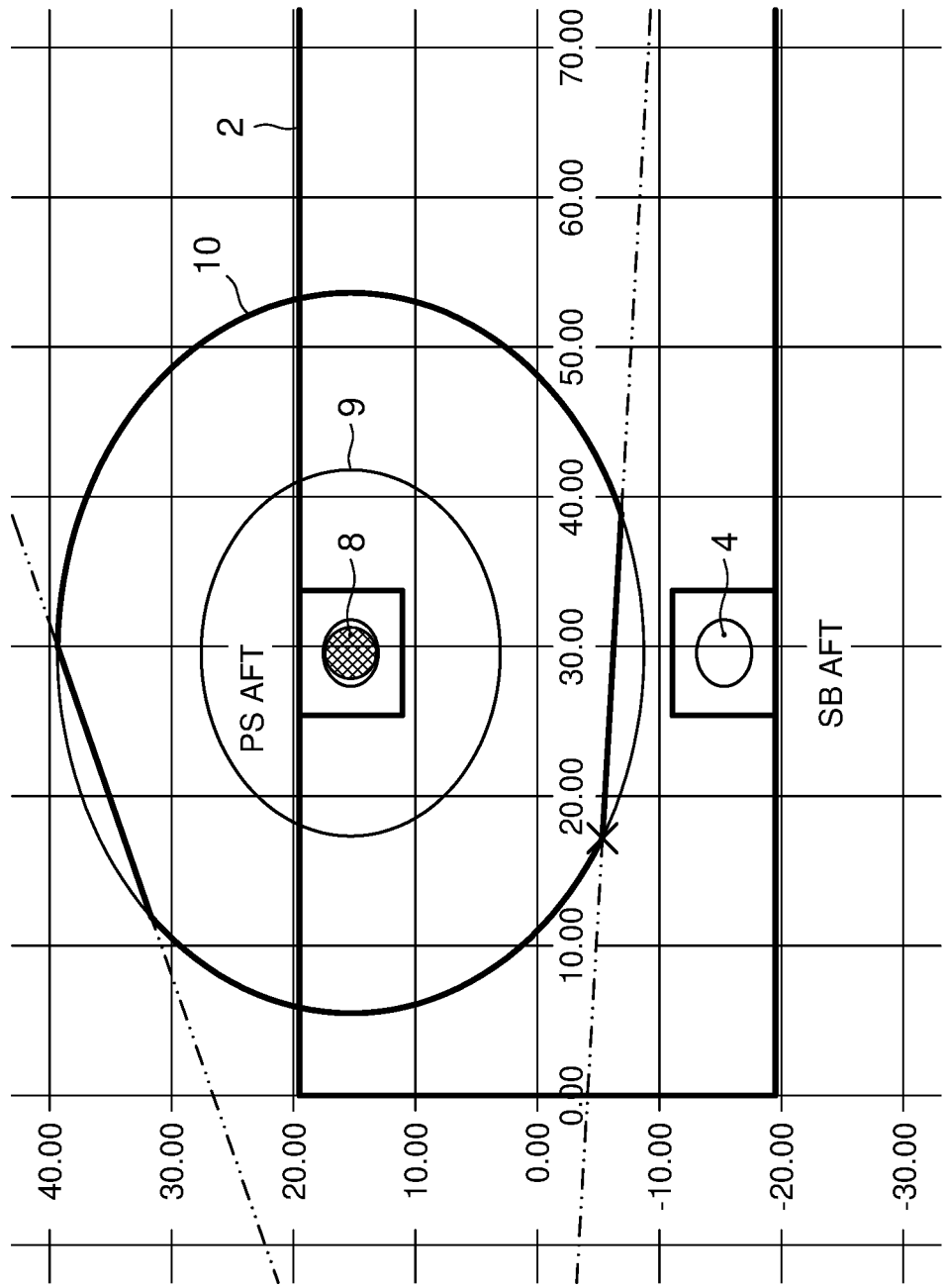

FIGS. 3a, 3b, 3c and 3d show a series of four graphs representing a safe working range for a given crane load of a crane 8 mounted on a hull 2 of a unit 1 shown in FIGS. 1a and 1b. The axes represent distances in metres. On the graphs, the aft of the hull 2 of a jack-up platform unit 1 is represented, having a width of 40 metres. The two aft legs of the four legs 4 are indicated, as well as a crane 8 around the aft leg on port side PS. Due to an inherent inclination of the crane arm, the crane cannot lift a load at an inner side of the inner circle 9, indicated in blue. When the crane 8 picks up a given load, of for example more or less 1200 tons (FIG. 3a) or more or less 1600 tons (FIG. 3c) at a radius of more or less 24 m, then the load is only allowed, for loading and stability reasons, to be moved along the external action radius 10, indicated in red, which is only a truncated circle. In the case represented in FIG. 3c, the load can hardly be lifted overboard without jeopardizing the stability of the platform unit 1. In order to solve this problem, the present method of stabilizing a jack-up platform unit further includes the step of applying a torque to the hull 2 of the jack-up platform unit 1. This is preferably done by decreasing the load on the leg which is closest to the crane 8, i.e. the aft leg on port side in this case. Thereto, the hull 2 can for example be slightly lowered along said aft leg on port side, resulting in an increase of the load on the aft leg on starboard and on the fore leg on port side. The hull 2 can also be lowered both along the aft leg on port side, i.e. where the crane 8 is located in the present example, and on the fore leg on starboard, which is diagonally opposite the crane leg, with the same result of increasing a load on the two other legs. When decreasing the load on the crane leg, there is a surplus load on the crane leg, which can be used to enlarge the working capacity of the crane 8 for a given lifting weight, and/or to increase the lifting weight of the crane, as can be seen in FIGS. 3b and 3d. A 1200-ton load on a given crane only results in a limited workability of the crane, as shown by circle 10 in FIG. 3a, whereas full workability is obtained when torquing of the hull 2 is applied, as shown in FIG. 3b. A 1600-ton load on the crane does not provide a workable crane range, as shown by the red circle 10 in FIG. 3c, but when a torque on the hull 2 is applied, the working range 10 of the crane comes close to complete, as shown in FIG. 3d. In this way, crane capacities on a jack-up platform unit can be substantially extended in a relatively reliable and cost-saving way.

For the purpose of clarity and a concise description, features are described herein as part of the same or separate embodiments, however, it will be appreciated that the scope of the invention may include embodiments having combinations of all or some of the features described. It may be understood that the embodiments shown have the same or similar components, apart from where they are described as being different.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage. Many variants will be apparent to the person skilled in the art. All variants are understood to be comprised within the scope of the invention defined in the following claims.

The invention claimed is:

1. A method for stabilizing a jack-up platform unit, the unit including:
    a hull,
    a plurality of legs which are extendible from and/or through the hull and which are arranged to support the platform unit during off-shore operations;
    a jacking system arranged to move the legs between a transport position, in which the legs extend substantially above the platform, and an operational position, in which the legs extend substantially below the platform to stand on a seabed, wherein the jacking system is also arranged to move the hull along the plurality of legs between a floating position, wherein the hull floats on water, and an operational position, in which the hull is substantially above sea surface;
  the method comprising the steps of:
    lowering the plurality of legs until the legs stand on or in the seabed;
    raising the hull substantially above the sea surface;
    temporarily applying a preloading on the plurality of legs;
    further raising the hull to an operational height above the sea surface;
    wherein the method further comprises a step of applying a torque to the hull of the jack-up platform unit when the hull is at operational height above the sea surface.

2. The method according to claim 1, wherein a torque to the hull is applied by decreasing load on at least one leg.

3. The method according to claim 2, wherein load is decreased on the at least one leg which is closest to at least one crane or cantilever mounted on the platform.

4. The method according to claim 3, wherein load is decreased both on the leg which is closest to the at least one crane or cantilever mounted on the platform, as well as on a leg which is located substantially diagonally opposite said leg closest to said at least one crane or cantilever.

5. The method according to claim 1, wherein the unit includes at least four legs.

6. The method according to claim 1, further comprising a step of substantially equalizing load on each of the legs before applying a torque to the hull of the jack-up platform unit.

\* \* \* \* \*